Nov. 10, 1964 R. K. RICHARDS 3,156,829

FLIP-FLOP INTERCONNECTION CIRCUITS

Filed Oct. 16, 1958

INVENTOR.

BY Richard K. Richards

Norman C. Fulmer

Att'y.

3,156,829
FLIP-FLOP INTERCONNECTION CIRCUITS
Richard K. Richards, Wappingers Falls, N.Y.
(1821 Allen Ave., Ames, Iowa)
Filed Oct. 16, 1958, Ser. No. 767,729
6 Claims. (Cl. 307—88.5)

Figure 1:
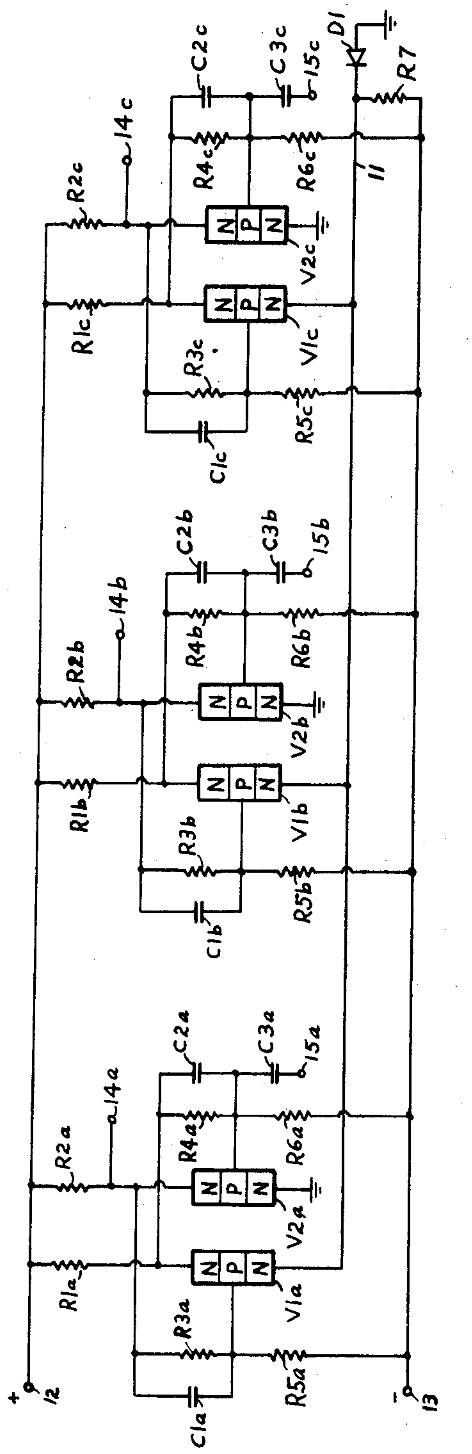

This invention relates to flip-flop circuits of the type used in electronic digital computers. More specifically, it relates to a circuit arrangement for interconnecting several flip-flop circuits in such a manner that one and only one will be in a given state of equilibrium at any one time.

In the design of electronic digital computers it is necessary to provide circuits for controlling the operations which are to be performed. This control is commonly provided by means of a set of flip-flop or bistable circuits. These flip-flops can be interconnected in various ways to provide control signals to indicate which operation is being performed at any given time and to actuate the parts of the computer which cause that operation to be performed. It is customary to provide one flip-flop for each type of operation the computer is capable of performing. The two stable states of each flip-flop may be designated as the ON and OFF state, respectively. Ordinarily, only one flip-flop in the set is ON at any given time with all of the others being OFF. The ON flip-flop generates a signal which initiates or selects the corresponding operation to be performed in the computer. The control of the flip-flops may be either through the use of a plug board or control panel, or through internal electrical connections. No problem has been encountered in turning ON the appropriate flip-flop for each operation, but the turning OFF of the last previously ON flip-flop has required, in the prior art, an objectionably large amount of equipment because in general the sequence of ON flip-flops is not uniform but varies in a substantially random manner in accordance with the nature of the problem being solved by the computer. Circuits must be incorporated for sensing which flip-flop was ON and for directing a signal to that particular flip-flop for turning it OFF. An alternative solution, in the prior art, is to send a signal to all flip-flops in the set to turn them OFF with the signal for turning ON being relied on in some manner to override the signal for turning OFF. For reliable operation this method of operation requires that component and signal tolerances be held to undesirably close limits.

Accordingly, it is an object of this invention to provide a circuit for interconnecting a set of flip-flop circuits so that when one flip-flop is turned ON any other flip-flops which may have been ON will automatically be turned OFF.

Another object is to provide a circuit which performs the function described with a minimum of components.

A further object is to provide a circuit which performs the function described in a reliable manner without unusual restrictions on signal or component tolerances.

The objects of this invention are achieved by connecting the emitter (assuming transistors are employed in the flip-flop circuits) of one transistor in each flip-flop to a common connection instead of to electrical ground, and a resistor is connected between this common connection and a source of supply voltage. In a preferred embodiment of the invention, a diode is connected between the common connection and electrical ground, so that when the circuit is in a quiescent condition, the potential of the common connection is held at ground potential through the action of the diode connected to ground and the resistor connected to the supply voltage. When only one flip-flop is in the ON condition, the current drawn through the resistor is insufficient to cause the potential of the common connection to be raised above ground potential. However, when an external signal is applied to a second flip-flop to cause it to be turned ON, the increased current through the resistor is sufficient to cause the potential of the common connection to change. This change in potential is of a polarity to initiate an action in the first ON flip-flop to turn it to the OFF condition and the nature of the circuit is such that the turn-OFF action is effective regardless of which flip-flop in the set was ON initially.

The objects described above, as well as other objects of the invention, are achieved as disclosed in the following description and the accompanying drawing, which disclose, by way of examples, preferred embodiments of the invention and the best modes which have been contemplated for carrying out the principles of the invention.

In the drawing:

FIG. 1 is a circuit diagram of a preferred embodiment of the invention. Three flip-flops are shown in this circuit, but the invention may be extended to any number of flip-flops. The type of active components shown in the flip-flops is NPN transistors, but it should be understood that the principles of the invention are not limited to these components. In particular, PNP transistors or vacuum tubes may be substituted for the NPN transistors. In the case of PNP transistors, all polarities must be interchanged from the polarities shown, but there is no alternation in the principles of operation.

Figure 2:
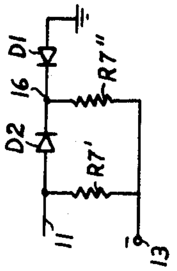

FIG. 2 shows a modification of a portion of FIG. 1 wherein it is assured that at least one of the flip-flops will be in the ON state.

In FIG. 1 the numerical designations for the components of the three flip-flops contain the letters *a*, *b*, or *c* in accordance with the particular flip-flop of which the components are a part. Transistors V1*a* and V2*a* are the active components in flip-flop "*a*." The emitter of V1*a* is connected to a point 11, which is a connection that is common to all flip-flops. The emitter of V2*a* is connected to ground. The collectors of V1*a* and V2*a* are connected through resistors R1*a* and R2*a*, respectively, to a source of positive potential at a terminal 12. The collector of V1*a* is also connected through the parallel connection of a resistor R4*a* and a capacitor C2*a* to the base of V2*a*, and the base of V2*a* is further connected through a resistor R6*a* to a source of negative potential at terminal 13. The collector of V2*a* is similarly connected, through a capacitor C1*a* and a resistor R3*a*, to the base of V1*a*, with the base of V1*a* also being connected through a resistor R5*a* to terminal 13. The components of the "*b*" and "*c*" flip-flops are similarly connected. A diode D1 is connected between the point 11 and ground with a polarity such that current flow readily occurs from ground to point 11, but current flow in the opposite direction is prevented (opposite directions prevail for the electron flow). A resistor R7 is connected between point 11 and terminal 13. The collectors of V2*a* V2*b*, and V2*c* are connected to output terminals 14*a*, 14*b*, and 14*c*, respectively. The bases of V2*a* V2*b*, and V2*c* are connected through capacitors C3*a*, C3*b*, and C3*c*, respectively, to input terminals 15*a*, 15*b*, and 15*c*, respectively.

The operation of each individual flip-flop circuit is conventional in that one transistor in the flip-flop is maintained conducting with the other being in a cut-off condition. The operation of a flip-flop may be understood by assuming that the emitter of each V1 transistor as well as the emitter of each V2 transistor is connected to ground. With this connection it may be readily observed from FIG. 1 that if one transistor in a flip-flop is conducting, the relatively negative potential occurring at the collector of this transistor will cause the potential at the base of the opposite transistor to be negative and thereby cause that transistor to be cut off. The relatively positive potential which then occurs at the collector of this other transistor will cause the base of the first transistor to be held at a positive value to maintain the first transistor in a conducting condition. The flip-flop will remain in this state of stable equilibrium indefinitely.

In the description to follow, the convention will be adopted that a flip-flop is OFF when the V2 transistor is conducting and the V1 transistor is cut off. The opposite conditions will prevail for the ON state. Accordingly, the potential at an output terminal will be relatively negative or positive according as the corresponding flip-flop is OFF or ON.

For the desired operation of the circuit in FIG. 1, it is preferred that the value of resistance used for resistor R7 be such that the amount of current normally flowing through it from ground to terminal 13 (with none of the V1 transistors conducting) will be greater than the amount of current flowing through the conducting transistor in one flip-flop but less than twice this amount. With the resistance of R7 in this range, the potential of point 11 will be held at ground potential (neglecting the relatively small voltage drop across the diode) if none or only one of the flip-flops is in the ON state. If none of the flip-flops is in the ON state, there will be no current through any of the V1 transistors so that the flip-flops will have no effect on the flow of current from ground through diode D1 and resistor R7 to terminal 13. If one of the flip-flops is ON, one of the V1 transistors will be conducting. This condition will cause some of the current flowing through resistor R7 to be supplied from the emitter connection of the corresponding V1 transistor with a diminished amount being supplied through D1. However, because the current through R7 is greater than the amount arriving from the transistor, the potential at point 11 will not become more positive than ground potential. The potential at point 11 can never become more negative than ground potential because of the clamping action of diode D1.

Assume, for purposes of illustration, that the "*a*" flip-flop is ON with the "*b*" and "*c*" flip-flops OFF. Assume further that a negative input pulse is applied at input terminal **15*b***. This negative input pulse will cause the *b* flip-flop to be turned ON by the following action. The pulse is capacitively coupled through capacitor **C3*b* to the base of transistor V2*b* to cause it to become cut off. The positive-going signal then occurring at the collector of V2*b* is coupled, through capacitor C1*b* and resistor R3*b*, to the base of transistor V1*b* so as to cause V1*b* to become conducting. The negative-going signal which thereby created at the collector of V1*b* is coupled through capacitor C2*b* and resistor R4*b* to the base of transistor V2*b* to maintain V2*b*** in a cut-off condition and hold the *b* flip-flop in the ON condition.

In the course of the action described in the previous paragraph there will be a short period of time when both of the transistors **V1*a* and V1*b* will be conducting. Because the signal transmitted through capacitor C1*b* to the base of transistor V1*b* is sufficiently large to cause the base of V1*b* to become positive with respect to ground and because the normal current flow through R7 is less than the sum of the currents flowing through V1*a* and V1*b* when the potential at point 11 is at ground potential, the potential at point 11 will become positive with respect to ground. This positive potential at point 11 will cause the emitter of transistor V1*a* to become positive with respect to the potential of the base of V1*a* and tend to cause this transistor to become cut off. The resulting positive-going signal at the collector of transistor V1*a* will then be transmitted through resistor R4*a* and capacitor C2*a* to the base of transistor V2*a* to cause this transistor to become conducting. The negative-going signal thereby created at the collector of transistor V2*a* will be transmitted, through capacitor C1*a* and resistor R3*a*, to the base of transistor V1*a* to hold V1*a*** in the cut-off condition. By this action the status of the "*a*" flip-flop is changed from ON to OFF.

Because of the symmetry of the circuit it may be observed that when one flip-flop is turned ON any other flip-flop that may have been ON will be turned OFF regardless of which flip-flop was ON previously.

With the circuit as shown in FIG. 1, it is possible for all flip-flops to be in the OFF state simultaneously, with none of them ON. In some applications the possibility of this combination of stable states is of no consequence, but in other applications it is required that one flip-flop be ON at all times. This requirement can be met by removing the diode D1 from the circuit. With D1 removed, if all flip-flops should happen to be OFF, the potential at point 11 will approach the negative potential at terminal 13 because there will be no current flowing through R7 from any source. However, this negative potential will be applied to the emitters of all V1 transistors and will cause at least one of the flip-flops to be turned ON. The action of the circuit in response to input pulses applied at the input terminals would then be the same as before. With D1 removed, the value of resistance of R7 is somewhat more critical. The resistance value should be such that the amount of current flowing through it from ground to terminal 13 (assuming the point 11 to be temporarily grounded) is substantially the same as that flowing through the conducting transistor in one flip-flop; otherwise, the potential at point 11 will become substantially different from ground potential and would cause erratic operation of the flip-flops.

By using the network shown in FIG. 2 in place of the diode D1 and resistor R7 of FIG. 1, a less critical situation is obtained for insuring that at least one of the flip-flops will be in the ON state. Diode D1 serves the same function and purpose as before but is connected between ground and a point 16. A resistor R7′ is connected between point 11 and the negative supply voltage at terminal 13. A resistor R7″ is connected between point 16 and terminal 13, and a diode D2 is connected between point 11 and point 16 with the low resistance for current flow being in the direction from point 11 to point 16. The resistance of resistor R7′ is chosen to be relatively high but not so high that it is not capable of bringing the potential of the emitters of the V1 transistors sufficiently negative to cause at least one flip-flop to be turned ON. When one flip-flop becomes ON the current through resistor R7′ will tend to cause the potential at point 11 to become positive with respect to ground, and diode D2 then becomes conducting and current from the ON flip-flop will also flow through R7″ to terminal 13. The effective parallel resistance of R7′ and R7″ is the same as the resistance of R7 in FIG. 1. When one flip-flop is ON the action of the circuit of FIG. 2 is substantially the same as for the circuit in FIG. 1.

It has been shown, by way of preferred embodiment of the invention, how flip-flops can be interconnected so that the turning ON of any one of them will cause any others that may have been ON to be turned OFF in a simple, reliable, and inexpensive manner. It is to be understood that the above-described preferred embodiments and variations thereof are illustrative of the applications of the principles of this invention, and other embodiments, and modifications thereof, can be devised by those skilled in the art without departing from the spirit and scope of the invention as defined in the claims.

What is claimed is:

1. A circuit comprised of a plurality of flip-flops with each of said flip-flops comprising two current controlling devices with each of said devices comprising a current emitting electrode, an electrical connection from a first potential source to the current emitting electrode of one of said devices in each of said flip-flops, an electrical junction connected to the current emitting electrode of the other of said devices in each of said flip-flops, a resistor connected between said junction and a second potential source, and potential controlling means interconnecting said first potential source and said junction.

2. A circuit as in claim 1 in which said potential controlling means comprises a diode with one terminal connected to said first potential source and the other terminal connected to said junction.

3. A circuit as in claim 2 in which the resistance of said resistor is such that if said resistor were connected between said first and second potential sources the amount of current that would flow through said resistor would be between one and two times the amount of current that flows through a conducting one of said current controlling devices in said flip-flops.

4. A circuit as in claim 1 in which said potential controlling means comprises two diodes with a terminal of one of said diodes connected to the like terminal of the other of said diodes at a second junction and with the opposite terminal of one of the said diodes connected to said first potential source and the opposite terminal of the other of said diodes connected to said junction and in which a second resistor is connected between said second junction and said second potential source.

5. A circuit as in claim 4 in which the resistances of said resistor and said second resistor are such that if said resistor and said second resistor were connected in parallel between said first and second potential sources the total current that would flow through said resistor and said second resistor would be between one and two times the amount of current that flows through a conducting one of said current controlling devices in said flip-flops.

6. A circuit as in claim 1 in which the resistance of said resistor is such that if said resistor were connected between said first and second potential sources the amount of current that would flow through said resistor would be between one and two times the amount of current that flows through a conducting one of said current controlling devices in said flip-flops.

References Cited in the file of this patent

UNITED STATES PATENTS

| | | |
|---|---|---|
| 2,647,997 | Williams | Aug. 4, 1953 |
| 2,778,878 | Malthaner et al. | Jan. 22, 1957 |
| 2,840,708 | Sandiford | June 24, 1958 |
| 2,854,589 | Ingham | Sept. 30, 1958 |
| 2,944,164 | Odell et al. | July 5, 1960 |
| 2,984,753 | Della Salle | May 16, 1961 |